June 6, 1933.  W. A. BLUME  1,912,684
FRICTION BRAKE SHOE
Filed June 28, 1930
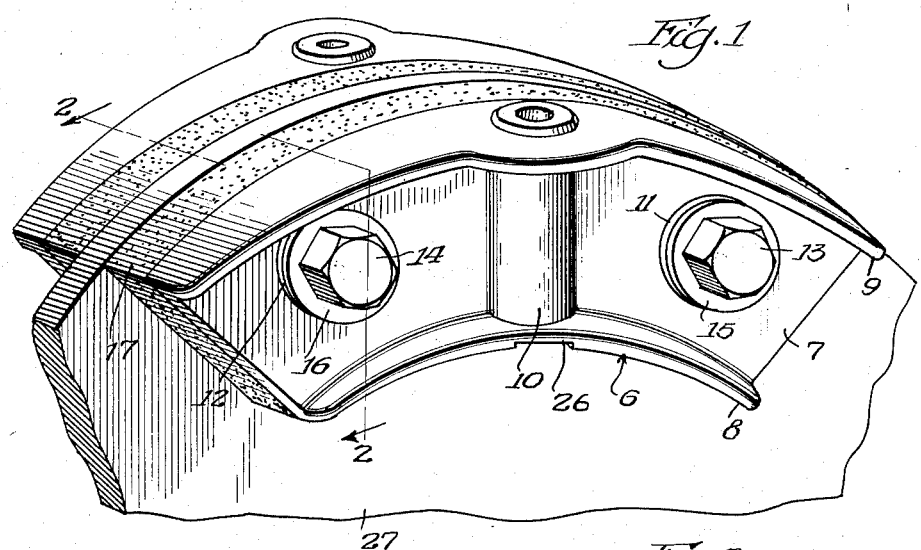
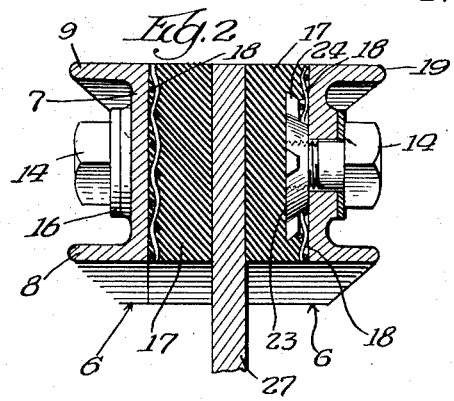
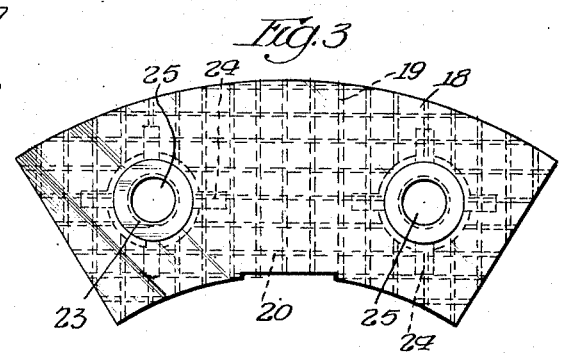
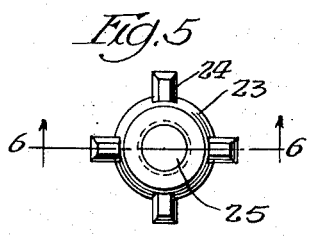
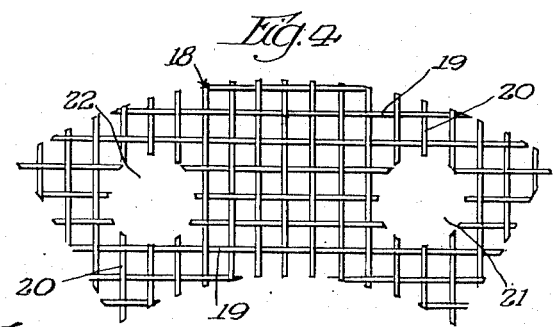
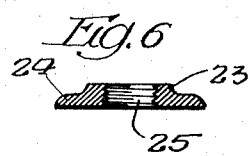
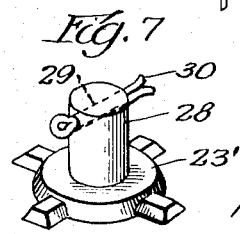
Inventor:
William A. Blume
By Wm. O. Belt
Atty.

Patented June 6, 1933

1,912,684

UNITED STATES PATENT OFFICE

WILLIAM A BLUME, OF DETROIT, MICHIGAN, ASSIGNOR TO AMERICAN BRAKEBLOK CORPORATION, OF NEW YORK, N. Y., A CORPORATION OF NEW YORK

FRICTION BRAKE SHOE

Application filed June 26, 1930. Serial No. 464,636.

This invention relates to friction brakes and more particularly to that form which embodies a slipper adapted for use with a rotating disk.

The objects of the invention are to provide a novel slipper which may be readily installed in position and replaced whenever desired, and which comprises in unitary form a composition friction body having a reenforce back of reticulated structure embedded therein, Selected embodiments of the invention are illustrated in the accompanying drawing and, therein, Fig. 1 is a perspective view illustrating my invention in association with a fragmentally illustrated rotatable disk;

Fig. 2 is a sectional view taken substantially on the line 2—2 of Fig. 1;

Fig. 3 is an elevation of the back of the removable portion;

Fig. 4 is a view similar to Fig. 3 showing only the reenforcing member;

Fig. 5 is a detail view of an attaching or anchor member employed in the device;

Fig. 6 is a sectional view taken substantially on the line 6—6 of Fig. 5; and

Fig. 7 is a perspective view of a modified form of construction for the attaching or anchor member.

Referring to the drawing showing my improved slipper, 6 is the shoe which, in the present instance, embodies a segmental body portion 7 having flanges 8 and 9 along the side edges thereof. At substantially the medial portion on the shoe 6 a bearing 10 is provided and the operating and supporting means are connected in this bearing in a suitable manner. On each side of the bearing 10 on the body 7 are bosses 11 and 12 having openings therein through which bolts 13 and 14 are passed to secure the friction portion of the slipper to the shoe 6, washers 15 and 16 being arranged intermediate the heads of the bolts 13 and 14 and the faces of the bosses 11 and 12.

The friction portion of the slipper comprises a composition friction body in the form of a block indicated by 17 formed of a suitable composition friction material. This composition friction material is pressed, molded, or otherwise joined to a reenforce 18. The reenforce, in the present instance, is a reticulated member of segmental shape corresponding to the shoe and consists of longitudinal bars 19 and cross bars 20. Spaced from the ends in the reenforce 18 are openings 21 and 22. Attaching members or anchors 23 are provided which are in the form of flat disks having lugs 24 extending from the periphery thereof and of less thickness than the thickness of the disks, these lugs being spaced, as for example, at 90° intervals about the disks. The peripheries of the disks are tapered and these disks 23 are inserted into the openings 21 and 22 so that the lugs 24 will rest against the inner face of the reenforce 18. In the disks or attaching members 23 tapped openings 25 are provided into which the bolts 13 and 14 are extended to secure the block 17 to the shoe 6.

The composition friction material is pressed or otherwise joined to the reenforce 18 and portions of this material enter the reticulations to embed the reenforce in and join it with the composition friction material. The anchors 23 will be embedded in the friction material with the faces thereof disposed in the rear face of the block provided by the reenforce and the material. In the lower edges of the flange 8, the reticulated back 18, and the composition material a clearance recess 26 is formed.

In the present instance, a disk indicated by 27 is arranged for rotation in a vertical plane, and slippers of the above described character are arranged in opposition on each side of the disk with the blocks thereon faced toward the disk. When these slippers are moved into engagement with the disk and pressure is applied a braking action results to retard rotation of the disk which may be, if desired, the disk of a so-called disk brake.

In Fig. 7 a modified form of construction for the anchors, which is indicated by 23', is disclosed and herein the anchors are constructed substantially similar to the manner heretofore described, but in place of providing tapped openings 25, studs 28 are extended outwardly from the anchor members which extend through the openings in the shoe 6 through which the bolts 14 have been described as extending. Through openings 29 at the outer ends of the studs 28, retaining devices such as the cotter keys 30 are extended and in this manner the studs 28, and therefore the composition friction material, are attached to the shoe to provide the slipper.

While I have illustrated and described a preferred form of my invention, it is to be understood that this is capable of variation and modification without departing from the purview thereof as set forth in the following claims.

I claim:

1. A slipper for a friction brake including a block of composition friction material providing a flat braking surface, a reticulated reenforce for the block having enlarged openings therein, and anchors including lugs disposed inwardly of said reenforce and embodying portions extended through said openings, said lugs having the faces thereof engaged with the inner side of said reenforce to insure rigid anchoring thereof.

2. A slipper for a friction brake including a block of composition friction material providing a flat braking surface, a reticulated reenforce for the material embedded in the face of the block opposite the braking surface, said reenforce having enlarged openings therein, and anchors including portions extended through said openings with the ends thereof flush with the face of said block having the reenforce embedded therein, said anchors having lugs thereon including faces engaged with said reenforce and embodying tapered edges extending from the faces thereof engaged with said reenforce whereby said composition friction material is firmly engaged with said anchors to retain said anchors in engagement with said back, the engagement of the faces of said lugs with said back serving to dissipate stress throughout said back to insure rigid connection between said shoe and the reenforce and composition material.

3. A slipper for a friction brake including a block of composition friction material providing a flat braking surface, a reenforce for the material embedded in the face of the block opposite the braking surface, and anchors arranged inwardly of the reenforce including studs extended outwardly from the face of the block opposite the braking surface, said studs cooperating with securing devices to secure the block on a shoe, said anchors having lugs thereon including faces engaged with said reenforce and embodying tapered edges extending from the faces thereof engaged with said reenforce whereby said composition friction material is firmly engaged with said anchors to retain said anchors in engagement with said back, the engagement of the faces of said lugs with said back serving to dissipate stress throughout said back to insure rigid connection between said shoe and the reenforce and composition material.

4. A slipper for a friction brake including a block of composition friction material providing a flat braking surface, a reticulated reenforce for the material embedded in the face of the block opposite the braking surface, said reenforce having enlarged openings therein, anchors having portions extending into said openings and including spaced lugs having the faces thereof engaged with the inner face of said reenforce, said lugs having tapered sides whereby the composition friction material is firmly united therewith to retain said anchors in position.

WILLIAM A. BLUME.